United States Patent [19]

Boone et al.

[11] 4,008,770
[45] Feb. 22, 1977

[54] SCRAPER ASSEMBLY FOR GROUND TILLAGE IMPLEMENT DISCS

[75] Inventors: James A. Boone; Dennis L. Lewallen, both of Quinter; Harold G. Walker, WaKeeney, all of Kans.

[73] Assignee: Harold G. Walker, WaKeeney, Kans. ; a part interest

[22] Filed: Apr. 10, 1975

[21] Appl. No.: 566,725

[52] U.S. Cl. .............................. 172/566; 172/762; 172/775
[51] Int. Cl.² ......................................... A01B 15/16
[58] Field of Search .......... 172/558, 559, 560, 566, 172/565, 551, 701, 561, 562, 563, 564

[56] References Cited
UNITED STATES PATENTS

| 718,825 | 1/1903 | Davis | 172/561 X |
| 756,107 | 3/1904 | Fetzer | 172/566 |

*Primary Examiner*—George J. Marlo
*Attorney, Agent, or Firm*—Edwin L. Spangler, Jr.

[57] ABSTRACT

This invention relates to an improved scraper assembly for the discs of ground tillage implements which is characterized by a mounting bracket fastenable onto the implement frame, an inverted generally L-shaped hanger subassembly carried by the mounting bracket for pendulous pivotal movement about an axis defined by the horizontally-disposed leg of said subassembly, a blade-carrying shaft mounted for rotational movement in the downwardly-opening vertically-disposed leg of the L-shaped subassembly, the latter element defining a self-cleaning housing therefor, biasing means connected between the bracket and hanger subassembly normally biasing the scraper blade housed therein against the concave face of the adjacent disc, an oversize annular groove in the shaft to which the blade is attached located inside the housing defined by the downwardly-opening tubular element of the hanger subassembly, a pin carried by said tubular element in tangential relation to the bottom of the annular groove within the shaft, and a ball-type thrust bearing at the upper closed end of the tubular element effective to absorb the thrust loads imposed upon the blade shaft while, at the same time, preventing the pin from touching the sides of the groove when under load.

6 Claims, 4 Drawing Figures

SCRAPER ASSEMBLY FOR GROUND TILLAGE IMPLEMENT DISCS

Ever since disc-type ground tillage implements have been used to plow furrows in the earth, there has been the problem of keeping them cleaned off and thus effective to perform as intended. Mud becomes impacted between adjacent discs as well as stuck to them individually, all resulting in the implement failing to till the ground properly. There have been repeated efforts to solve this ever-present problem, most of which took the form of some type of scraper blade positioned adjacent the disc in sliding engagement therewith. It was recognized quite early that these scrapers could not be rigidly mounted relative to the disc because, if they were, rocks, clods and other debris would eventually become wedged therebetween and break them off. The associated problem was, of course, that some adjustable means, preferably self-adjusting, was needed to accommodate blade wear, dents in the disc and other imperfections therein. As a result, most of the prior art units did, in fact, provide for some type of relative movement between the scraper blade and disc it was to clean, usually in the form of a spring-biased yieldable connection.

Provision was even made for the blade to turn or twist relative to the surface of the disc as well as move toward and away therefrom. Often, such a pivotal connection took the form of a shaft depending from the scraper blade housed for rotational movement within some type of tubular housing therefor. Since the wear on the scraper blades was excessive, they often had to be replaced and a circumferential slot in the housing receiving a pin projecting from the blade shaft provided a detachable coupling that also permitted limited rotation of the blade.

While these prior art units go a long way toward solving the problem of keeping the discs clean and effective, they still leave a good deal to be desired in terms of designs that will resist the abuse occasioned by adverse operating conditions for long periods of time without either wearing out or failing to function as intended. For instance, many such units quickly become impacted with dirt and mud thrown up into the mechanism during normal use and the scraper blade eventually ceases to swing against the disc or pivot relative thereto or both. Once this happens, the whole assembly, of course, becomes inoperative for its intended purpose. It is, therefore, desirable that the assembly be so constructed that it has a self-cleaning action.

The wear factor is equally important, especially to a farmer who can ill afford the "down time" necessary to replace or repair defective, worn or inoperative equipment. This is especially true when replacement parts mean a trip to the nearest dealer and, perhaps, having to order them from the factory before repairs can be made. Disc-cleaning assemblies of the type found in the prior art are especially susceptible to wear and premature failure due to the fact that many, if not most, of them utilize some sort of a slot and pin swivel connection that permits the blade to turn relative to the housing therefor and it is this connection that must be able to withstand the considerable vibration and thrust loading imposed upon the scraper blade as it rides over the surface of the disc encountering impediments in terms of mud, grit and the like as it goes.

It has now been found in accordance with the teaching of the instant invention that these and other shortcomings of the prior art disc scrapers can, in large measure, be overcome by enclosing the swivel connection between the blade and its housing in the upper end of a tubular member closed at the top so as to effectively eliminate the entry of dirt, moisture and the like therein. The position of this coupling is so far removed from the open bottom of the tube that it is virtually impossible for any significant amount of dirt or moisture to work its way clear up to where the coupling is located. Furthermore, the open-bottomed tube is self cleaning and the blade shaft turning to and fro therein acts much like an agitator preventing the build up of hard encrustations of mud and the like in the space between these elements. Some grinding and pulverization even takes place that reduces the size of the particulate matter to a degree where it will easily gravitate free of the assembly.

As far as resisting the thrust loads is concerned, a ball-type thrust bearing is positioned at the upper blind end of the tube against which the upper end of the blade shaft bears and turns. This bearing is effective to keep the pin that detachably mounts the blade shaft within an annular groove in the latter out of contact with the sidewalls thereof thus limiting its contact to light tangential contact with the bottom of the groove at all times the assembly is under load.

It is, therefore, the principal object of the present invention to provide a novel and improved scraper assembly for the discs of disc-type ground tillage implements.

A second objective is the provision of a device of the type aforementioned in which the key working parts are self cleaning.

Another object of the invention herein disclosed and claimed is to provide a tangential pin and groove rotatable connection between the blade shaft and housing therefor that is protected well up inside the closed upper end of the latter.

Still another objective is the provision of a thrust bearing so located with respect to the pin and groove that the pin rides between the side margins of the latter under load thus holding the wear to a minimum.

An additional object is the provision of a scraper assembly for disc plows and the like that is so designed as to remain substantially free of impacted mud and other materials in critical areas where the presence thereof would interfere with the freedom of the blade to turn back and forth as well as remain in scraping engagement with the disc.

Further objects of the invention are to provide a ground tillage implement accessory which is rugged, versatile, relatively inexpensive, compact, lightweight, easy to service and repair, and one that is readily adaptable to various makes, sizes, types and styles of disc plows.

Other objects will be in part apparent and in part pointed out specifically hereinafter in connection with the description of the drawings that follows, and in which.

Figure 1:
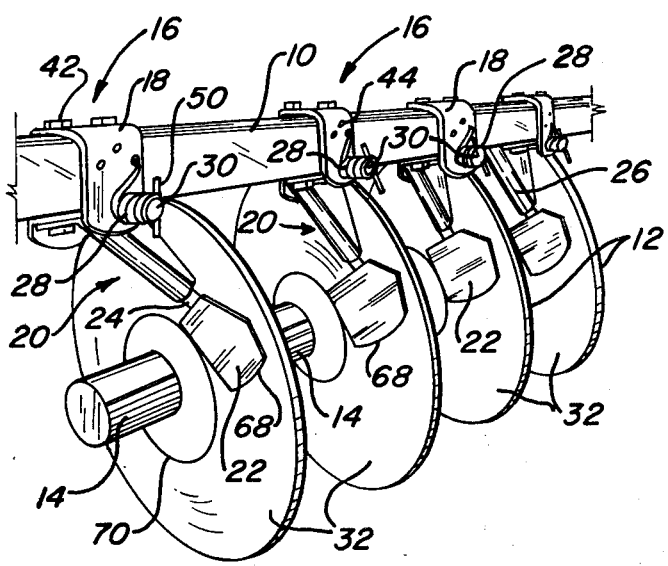
FIG. 1 is a fragmentary perspective view looking down and to the right upon the rear end of a disc-type ground tillage implement, the several discs of which are each equipped with the scraper assembly of the present invention.

Referring next to the drawings for a detailed description of the present invention and, initially, to FIG. 1 for this purpose, reference numeral 10 has been chosen to designate an implement frame beneath which are mounted a plurality of dished discs 12 mounted upon shaft 14, all of which cooperate with one another in the well-known manner to define a ground tillage implement. Attached to the implement frame in operative association with each disc is the scraper assembly of the present invention which has been referred to broadly by reference numeral 16 and which will be seen to include a mounting bracket 18, an inverted generally L-shaped hanger subassembly that has been designated in a general way by numeral 20 and which is pivotally attached to the mounting bracket for pendulous movement about a more or less horizontally disposed axis, a scraper blade 22 having a shaft 24 depending therefrom that is mounted for rotational movement about a vertically disposed axis within the hollow tubular journal 26 of the hanger subassembly 20, and biasing means 28 connected between the mounting bracket and horizontally disposed shaft 30 of the hanger subassembly normally urging the latter along with the blade carried thereby into scraping engagement with the concave surface 32 of the disc associated therewith.

Figure 2:
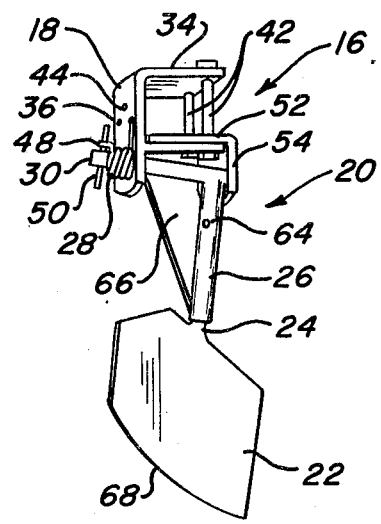
FIG. 2 is another perspective view to a slightly larger scale showing one of the scraper assemblies as it would appear looking to the left and upwardly from a vantage point to the rear thereof.
Figure 3:
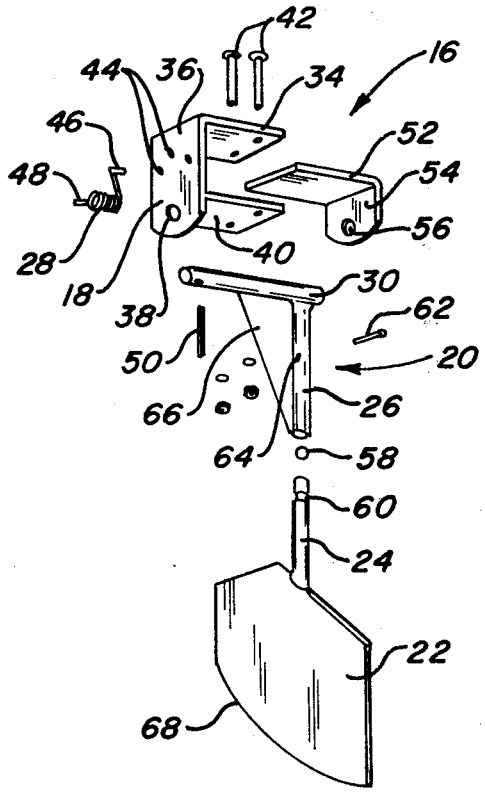
FIG. 3 is an exploded perspective view to the same scale as FIG. 2 but viewed from a position a bit lower and further to the left; and, FIG. 4 is a still further enlarged vertical half section, portions of the scraper blade having been broken away to conserve space.
Figure 4:
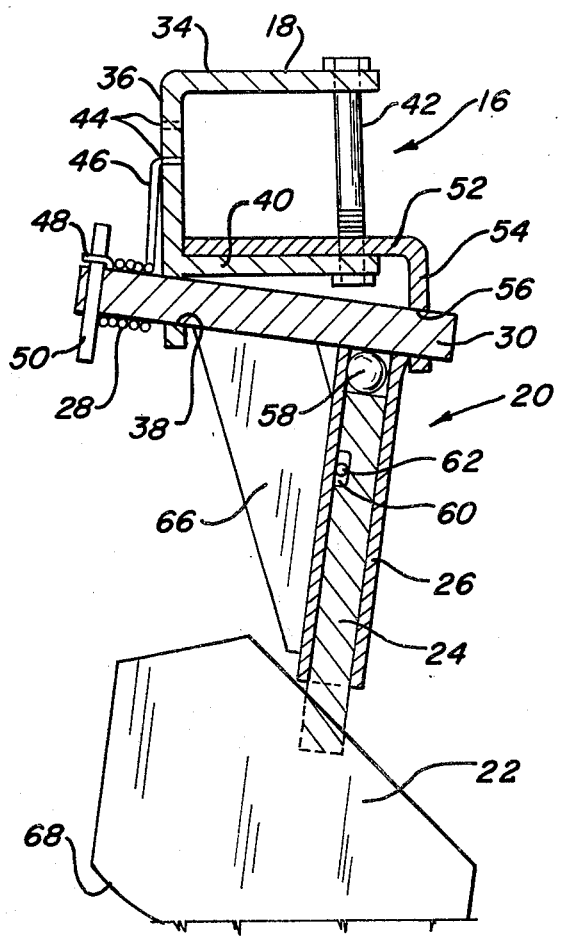

Reference will next be made to the remaining figures of the drawings, specifically FIGS. 2, 3 and 4 thereof, for a more detailed description of the scraper assembly 16 beginning with the mounting bracket 18. In the particular form shown, bracket 18 consists of an angle iron section having a horizontally disposed leg 34 adapted to lay atop the square implement frame element to which the assembly is attached and a vertically disposed leg 36 that projects therebeneath and includes an aperture 38 sized to receive shaft 30 of the hanger subassembly for rotation. Web 40 is welded to leg 36 of the angle iron above aperture 38 therein and in essentially spaced parallel relation to leg 34. Elements 34 and 40 project beyond the edge of the frame element remote from leg 36 in position to receive mounting bolts 42.

Vertical leg 36 is also provided with a set of three apertures 44 arranged arcuately above aperture 38 that receive and retain one hooked end 46 of the coiled spring that constitutes the biasing means 28 in the particular form shown. The other hooked end 48 of this spring hooks around pin 50 which projects more or less radially from the end of shaft 30 that extends beyond leg 36 of bracket 18. This spring is preloaded so as to rotate shaft 30 in a direction to urge blade 22 firmly against the concave face 32 of disc 12.

The remaining element of the bracket is a second angle iron, the horizontal leg 52 of which rests atop web 40 and is apertured to receive the mounting bolts 42 that hold it in place thereon. The downturned leg 54 also contains an aperture 56 which receives the end of shaft 30 opposite that which carries pin 50 for rotational movement. Thus, bracket 18 mounts the scraper assembly on the implement frame 10 and, at the same time, supports the hanger subassembly for pendulous movement therebeneath. Spring 28, on the other hand, defines an operative connection therebetween by means of which the hanger subassembly along with the blade associated therewith is biased against disc 12 adjacent thereto. It is, of course, obvious that bracket 18 is merely representative of but one type of bracket that could be used to mount the assembly upon the implement frame, there being many others that will do just as well and which are within the skill of an ordinary mechanic to design.

Hanger subassembly 20, in addition to shaft 30 and pin 50 already described in detail, has downwardly-opening tubular member 26 welded adjacent on end thereof so as to project downwardly therefrom toward the ground. Shaft 30 blocks the upper end of this tubular member and defines an abutment for ball 58 that defines a thrust bearing adapted to resist the upwardly-directed loads applied almost constantly to shaft 24 when the implement is in operation. In other words, as the discs rotate counterclockwise as viewed in FIG. 1, they frictionally engage blades 22 and tend to drive shaft 24 up inside tubular element 26 of the hanger assembly. In most if not all, of the prior art disc scrapers, this thrust is born by the retaining pin which holds the shaft in the tube thus subjecting the latter to considerable wear and causing it to fail prematurely. In the instant unit, on the other hand, shaft 24 is provided with an annular groove 60 that is oversize in width in comparison to retaining pin 62 as revealed in FIG. 4. Pin-receiving apertures 64 (FIGS. 2 and 3) in tubular element 26 are then located to place pin 62 intermediate the sidewalls of groove 60 when shaft 24 is seated firmly against the thrust bearing 58 as shown. Thus, the pin does not bend against the edges of the groove when under load, the only contact being tangential contact with the bottom thereof which is of no consequence as far as wear and premature failure is concerned.

In the particular form illustrated, the welded connection between the tube 26 and shaft 30 of the hanger subassembly is reinforced by a triangular sheet metal web 66 which has no other functional significance and could, for this reason, be eliminated altogether. The resulting hanger assembly 20 swings about the more or less horizontally disposed axis defined by shaft 30 and mounts the blade for pendulous movement therebeneath toward and away from the concave face of disc 12. It is important to note that, while mud, dirt, dust and water will, undoubtedly be thrown up by the disc into the open-bottom end of tube 26, the latter element is also self cleaning in that whatever enters some will eventually gravitate back out. This is especially true when one considers the fact that the blade 22 and shaft 24 depending therefrom are constantly turning back and forth as the blade rides over irregularities in the disc surface along with mud and other encrustations adhering thereto. In addition, the shaft is subject to constant rather severe vibratory motion as the blade moves over the rough surface of the disc and this is sufficient to dislodge almost any foreign substance that enters the space between the tube and shaft housed therein.

Finally, with respect to the scraper blade 22, it is of design well within the skill of the ordinary artisan having the disc-engaging edge 68 thereof shaped to conform with the concave surface 32 of the disc over which it rides so as to scrape same clean. The other edges of the blade, while some have been truncated for various reasons such as, for example, to miss the hub 70 of the disc, no novelty is predicated thereon.

What is claimed is:

1. A scraper assembly for cleaning the discs of disc-type ground tillage implements which comprises: bracket means connectable to the implement frame alongside one of the discs carried thereby, said bracket means including shaft-mounting means on the underside thereof adapted to receive a shaft for rotational movement about a substantially horizontally disposed axis; means defining a hanger subassembly having a horizontally disposed leg and a vertically disposed leg, the horizontally disposed leg comprising a first shaft mounted for pivotal movement in the shaft-mounting means of the bracket means and the vertically disposed leg comprising a tubular member open at the lower end thereof hanging down from the first shaft for pendulous movement toward and away from an adjacent implement disc alongside thereof upon rotational movement of said shaft; a scraper blade shaped to scrape the concave surface of an implement disc free of mud and the like when pressed thereagainst; a second shaft depending from the scraper blade mounted for rotational movement within the tubular leg of the hanger subassembly; connecting means detachably mounting the second shaft within the tubular member of the hanger subassembly for limited rotational movement relative thereto, said connecting means including a retaining pin carried by one of said second shaft and tubular members and an oversize pin-receiving opening positioned to receive said pin in the other of said members; biasing means connected between the bracket means and first shaft operative to continuously urge the scraper blade against the concave surface of a disc alongside thereof; and, means comprising a thrust bearing located in the tubular element of the hanger means in engagement with the upper end of the second shaft housed therein, said bearing cooperating with said first and second shafts upon engagement therebetween to relieve the thrust load upon said retaining pin when the scraper blade is under load against the scraper disc.

2. The scraper assembly as set forth in claim 1 in which: the upper end of the tubular member of the hanger subassembly is closed.

3. The scraper assembly as set forth in claim 1 in which: the oversize pin-receiving opening comprises a groove at least partially encircling said second shaft; and, in which the retaining pin is mounted within the tubular member of the hanger subassembly positioned to intersect the interior thereof and lie essentially tangent to the groove in said second shaft.

4. The scraper assembly as set forth in claim 3 in which: the groove in the second shaft is located near the upper end thereof.

5. The scraper assembly as set forth in claim 3 in which: the groove in the second shaft is substantially wider than the thickness of the retaining pin.

6. The scraper assembly as set forth in claim 1 in which: the thrust bearing comprises a spherical member sized to loosely fit inside the tubular member.

* * * * *